United States Patent [19]

Mahoney et al.

[11] Patent Number: 5,087,388
[45] Date of Patent: Feb. 11, 1992

[54] CARTRIDGE FOR EXTENDING THE LIFETIME OF DYES IN DYE LASERS

[75] Inventors: Robert P. Mahoney; Tad H. Koch, both of Boulder, Colo.

[73] Assignee: Research Corporation Technologies, Inc., Tucson, Ariz.

[21] Appl. No.: 484,533

[22] Filed: Feb. 26, 1990

[51] Int. Cl.[5] .................... C09K 11/07; H01S 3/213
[52] U.S. Cl. .................... 252/301.17; 252/301.35; 372/54; 372/53
[58] Field of Search ............. 252/301.17, 589, 582, 252/301.35, 587; 372/53, 54

[56] References Cited

U.S. PATENT DOCUMENTS

| | | | |
|---|---|---|---|
| H437 | 2/1988 | Conrad . | |
| 4,031,016 | 6/1977 | Berger | 252/50 |
| 4,428,859 | 1/1984 | Koch | 252/301.17 |
| 4,479,223 | 10/1984 | Fletcher . | |
| 4,807,237 | 2/1989 | Ernsting . | |
| 4,968,725 | 11/1990 | Mukai | 522/90 |
| 4,977,571 | 12/1990 | Furumoto | 372/54 |

FOREIGN PATENT DOCUMENTS 0232789 9/1989 Japan .

OTHER PUBLICATIONS

Winters et al., "Photochemical Products in Coumarin Laser Dyes", *Applied Physics Letters*, 12/15/74, pp. 723–724.

Mostovnikov et al., "Recovery of Lasing Properties of Dye Solutions After their Photolysis", *Soviet Journal of Quantum Electronics*, 9/76. pp. 1126–1128.

Kunjappu et al., "Enhancement of Lasing . . . ," *Photochem. and Photobiol, A:Chemistry*, 41 (1987), pp. 121–125.

Von Trebra et al., "Photochemistry of Coumarin . . . ," *J. of Photochemistry*, 35 (1986), pp. 33–46.

*Primary Examiner*—Margaret B. Medley
*Assistant Examiner*—Thomas Steinberg
*Attorney, Agent, or Firm*—Birch, Stewart, Kolasch & Birch

[57] ABSTRACT

A method for releasing trialkylamines into the dye circulation stream of a dye laser and a filter cartridge containing a resin bound anion stabilizing agent for insertion into the dye circulation stream of a dye laser improves the performance thereof, especially with respect to excimer and flashlamp pumped coumarin and carbostyryl dye lasers. The resin bears quaternary ammonium groups, and borohydride, bromide, hudroxide or chloride may be used as the counter ion. A resin bound borohydride stabilizing agent is capable of releasing trialkylamine into the dye circulation stream and reducing the carbonyl functional groups of polyarbonyl material in the stream to less light absorbing alcohol functional groups. A resin bound chloride stabilizing agent is capable of releasing trialkylamine into the dye circulation stream as a quencher and radical scavenger.

8 Claims, 15 Drawing Sheets

CARTRIDGE FOR EXTENDING THE LIFETIME OF DYES IN DYE LASERS

This invention was made with Government support under DAAL-03-87-K-0053 awarded by the Department of Defense. The Government has certain rights in the invention.

BACKGROUND OF THE INVENTION

1. Field of the Invention

The present invention generally relates to a method for improving the performance of a dye laser and a device for insertion into the dye circulation stream of a dye laser in order to improve the performance thereof. More specifically, the present invention relates to a method for releasing trialkylamine into the dye circulation stream of a dye laser and a filter cartridge containing a stabilizing agent for insertion into the dye circulation stream of a dye laser in order to improve the performance thereof.

2. Description of Related Art

A major problem associated with the use of dye lasers is the light induced chemistry of the dye laser solution which produces material which absorbs at the lasing wavelength of the dye. This material then interferes with stimulated emission of the excited dye and consequently greatly attenuates the output flux of the dye laser. It has been suggested that material which potentially interferes with stimulated emission from a Coumarin 311 dye laser results from a photochemical interaction between the dye and the solvent ethanol. von Trebra, R. J; Koch, T. H., "Two-Photon laser photochemistry of a coumarin laser dye," *J. Photochem. Photobiol., A:Chem.*, (1987), 41, pp. 111-120. The material possibly results from the initial formation of acetaldehyde and the photoprocess appears to be of a two-photon nature. The material has been proposed to bear polycarbonyl functionality.

An earlier U.S. Patent granted to a research group including one of the present inventors is directed to the stabilization of dye lasers and discloses the addition of 1,4-diazabicyclo (2.2.2)octane (DABCO) to the dye solution to quench a variety of transient species, including singlet oxygen, which is possibly involved in the formation of material which interferes with stimulated emission. The addition of DABCO improves the performance of excimer laser pumped dye lasers but not the performance of flashlamp pumped dye lasers as indicated in Fletcher, A. N.; Pietrak, M. E., *Appl. Phys. B,* (1985), 37, p. 151. Singlet oxygen is continuously produced by dye lasers as molecular oxygen dissolved in the dye solution serves as a quencher of triplet dye molecules. von Trebra, R. J.; Koch, T. H., "Photochemistry of coumarin laser dyes: the role of singlet oxygen in the photo-oxidation of coumarin 311," *J. Photochem.*, (1986), 35. pp. 33-46. The resulting singlet oxygen possibly participates in the production of the material interfering with stimulated emission.

Other attempts at improving the performance of dye lasers include the use of a so-called switching dye which is used to reduce the degree of amplification for the laser radiation after a short time interval by means of transient absorption as disclosed in U.S. Pat. No. 4,807,237 to Ernsting. U.S. Statutory Invention Registration No. H437 (published Feb. 2, 1988) discloses a polydisperse aggregate of small solid particles that form voids therebetween with a lasing dye solution in said voids to form a laser host medium. U.S. Pat. No. 4,479,223 to Fletcher discloses the use of an inert cover gas, such as argon, for a laser dye solution, in combination with the employment of a glass filter, such as Pyrex, disposed between the pumping flashlamp and the dye laser cavity used to extend the effective lasing lifetime of laser dyes including coumarin dyes.

Although the above-noted attempts have been made at improving the performance of dye lasers, problems remain with regard to the production of material which interferes with the stimulated emission of the excited dye which reduces the output of the dye laser. Therefore, it is desired to provide a device which improves the performance of dye lasers by suppressing this material which interferes with the stimulated emission of the excited dye.

SUMMARY OF THE INVENTION

Therefore, it is an object of the present invention to provide a means for suppressing material which interferes with the stimulated emission of the excited dye.

It is another object of the present invention to provide a method for improving the performance of a dye laser by releasing trialkylamine into the dye circulation stream thereof, wherein the trialkylamines suppress material which interferes with the stimulated emission of the excited dye.

It is a further object of the present invention to provide a filter cartridge which may be inserted into the dye circulation stream of a dye laser which improves the performance of the dye laser.

It is yet a further object of the present invention to provide a filter cartridge for insertion into the dye circulation stream of a dye laser which slowly releases trialkylamine which can serve as an effective singlet oxygen quencher, radical scavenger and triplet quencher so as to improve the performance of the dye laser.

Another object of the present invention is to provide a filter cartridge for insertion into the dye circulation stream of a dye laser, wherein the filter cartridge contains a stabilizing agent capable of reducing carbonyl functional groups of material in the stream to alcohol functional groups so as to enhance performance of the dye laser.

Still, a further object of the present invention is to provide a filter cartridge for insertion into the dye circulation stream of a dye laser wherein the cartridge contains a resin bound anion stabilizing agent for insertion into the dye circulation stream of a dye laser, wherein the resin bears a quaternary ammonium group to provide for release of trialkylamine into the dye circulation stream of a dye laser.

The foregoing objects and others are accomplished in accordance with the present invention, generally speaking, by providing a method for releasing trialkylamine into the dye circulation stream of a dye laser and a filter cartridge containing a resin bound anion stabilizing agent, especially a resin with a borohydride reducing anion, for insertion into the dye circulation stream of a dye laser.

Further scope of the applicability of the present invention will become apparent from the detailed description and drawings provided below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is further illustrated in the accompanying drawings wherein.

DETAILED DESCRIPTION OF THE INVENTION

The method and device of the present invention may be employed with a wide variety of dye lasers, such as, for example, excimer, nitrogen and YAG laser pumped dye lasers and flashlamp pumped dye lasers. These dye lasers may be, for example, coumarin or carbostyryl dye lasers or other lasers which employ laser dyes that produce singlet oxygen, triplet states, free radicals and/or carbonyl compounds which interfere with the stimulated emission of the dye.

In accordance with the method of the present invention, trialkylamine are released into the dye circulation stream of a dye laser. One embodiment of the method of the present invention provides for the slow release of a trialkylamine directly into the dye circulation stream of a dye laser. An example of a method for the slow introduction of a trialkylamine into the dye stream of a dye laser is with a syringe pump, such as Sage Instruments (Cambridge, Mass.) mode 355 pump, charged with a trialkylamine dissolved in the dye laser solvent. The pump should be capable of delivering a volume of trialkylamine solution of about 1 to 100 mL over a period of several hours to several days. The syringe pump may be connected to the dye stream in a conventional manner with a stainless steel T-type connector with an attachment for 1/16 in. O.D. Teflon tubing using standard fittings as available from chromatography and plumbing supply companies such as Alltech Associates (Deerfield, Ill.) and Denver Valve and Fitting Co. (Denver, Co.), respectively. The Teflon tubing may be attached to a standard syringe installed in the syringe pump via standard fittings also available from Alltech Associates. The T-type connector would best be inserted in the dye stream line which returns dye solution to the dye reservoir of the dye laser. This would insure full mixing of the trialkylamine into the dye solution. The trialkylamine may bear alkyl groups preferably of lower carbon number, for example $C_1$-$C_{10}$ alkyl groups, and more preferably $C_1$-$C_4$ alkyl groups. Examples of such trialkylamines include trimethylamine and tri-n-butylamine.

Figure 1:
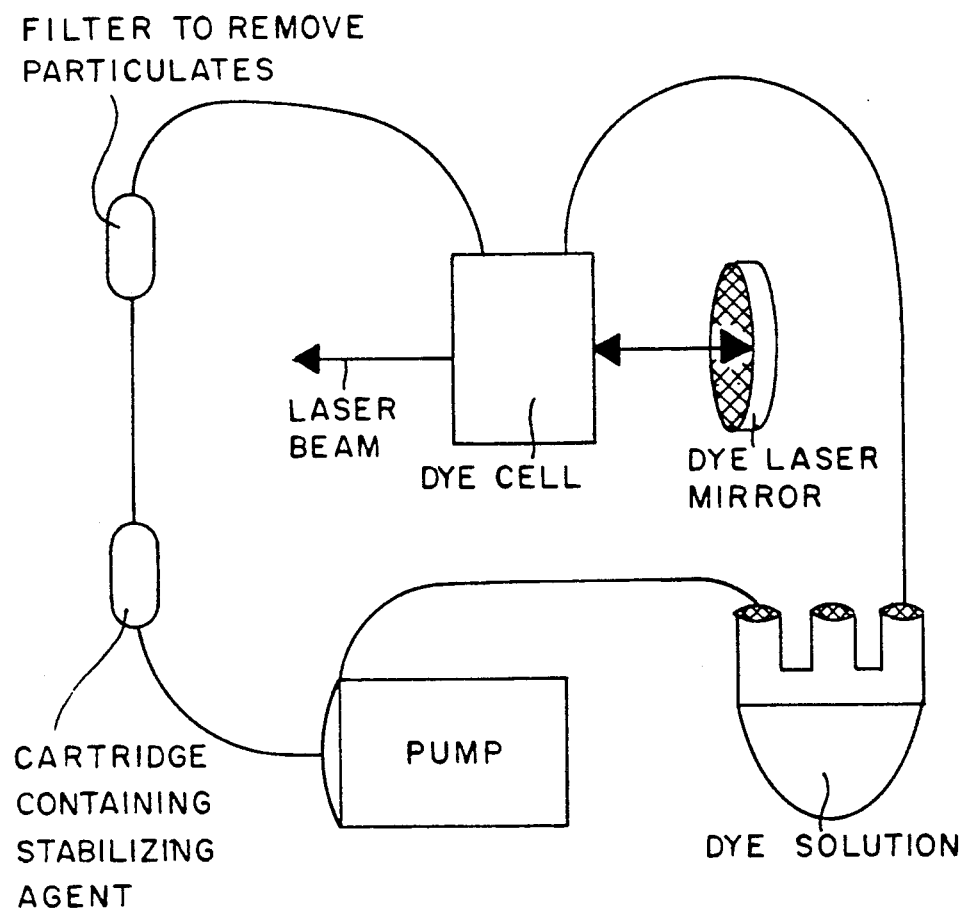
FIG. 1 is a schematic diagram of an excimer laser pumped dye laser setup showing the location of a filter cartridge according to the present invention.

The device of the present invention may be in the form of a filter cartridge which is inserted into the dye circulation stream of the laser. An example of a filter cartridge installed in a dye laser in accordance with an embodiment of the present invention is illustrated in FIG. 1 which depicts a schematic diagram of an excimer laser pumped dye laser setup. The excimer laser is not shown for clarity. The filter cartridge containing the stabilizing agent of the present invention may be installed in the dye solution supply line of the dye laser near a standard filter used to remove particulates in the dye circulation stream. In an alternative embodiment, the filter cartridge of the present invention may be structurally combined with the standard filter used to remove particulates.

Figure 2:
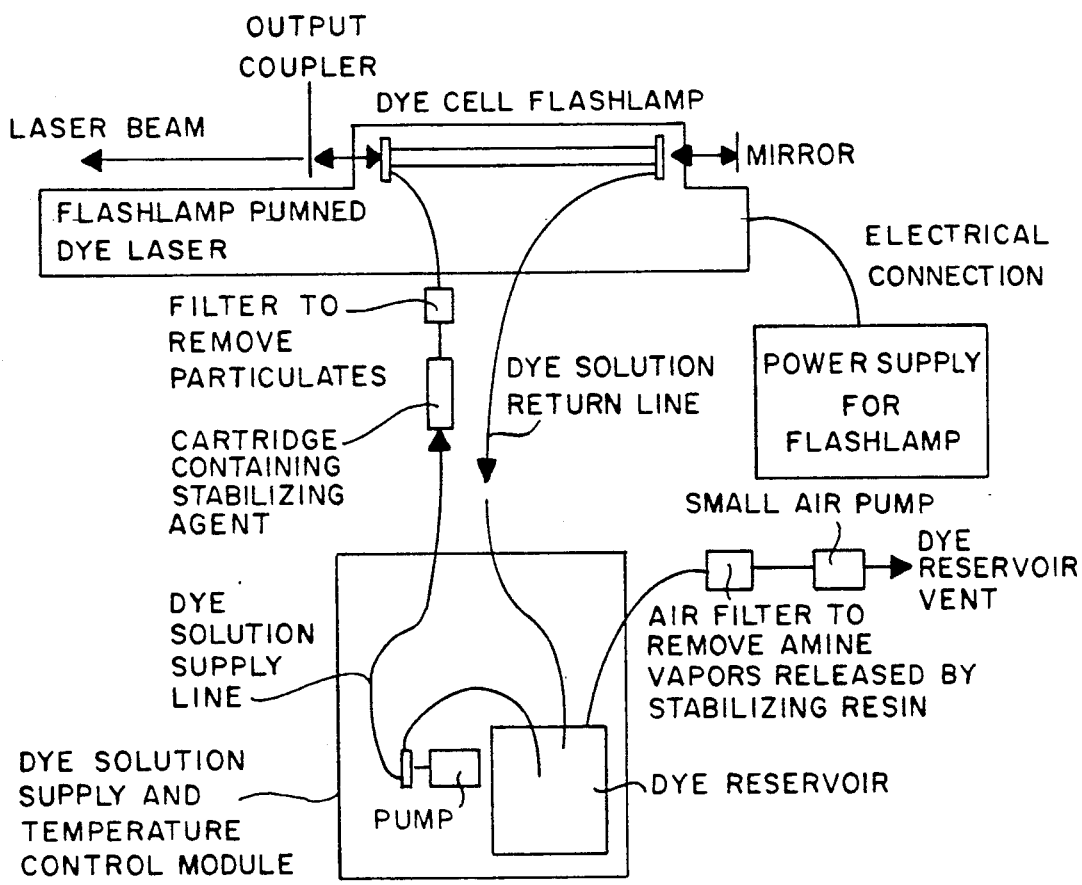
FIG. 2 is a block diagram showing the location of a filter cartridge according to the present invention installed in a flashlamp pumped dye laser.

Another example of an embodiment of the filter cartridge of the present invention installed in a dye laser is illustrated in FIG. 2 which depicts a block diagram of a flashlamp pumped dye laser. As shown in FIG. 2, the filter cartridge containing the stabilizing agent may be installed in the dye solution supply line of the dye laser near a standard filter used to remove particulates. Alternatively, the filter cartridge of the present invention may be structurally combined with the standard filter used to remove particulates. One small problem which may arise when using the filter cartridge of the present invention may be the release of amine vapors by the stabilizing agent which may be undesirable in the room in which the laser is operated. A solution to this minor problem is the installation of an air filter together with a small air pump, such as a conventional air pump used in an aquarium, in order to vent the dye reservoir as shown in FIG. 2. The air filter may employ activated carbon or alternatively an acidic ion exchange resin which would hold the amine by protonation. However, use of an acidic ion exchange resin to prevent release of the amines into the dye circulation stream may result in inferior laser performance as compared to performance exhibited when amines are released into the dye circulation stream and then vented. Alternatively, the amine vapors may be vented to a fume hood if available.

The filter cartridge of the present invention contains a resin bound anion stabilizing agent. Examples of suitable anions include borohydride, chloride, bromide, and hydroxide anions. The resin may be any polymer capable of binding the anion. For example, the resin may be a cross-linked polymer bearing a quaternary ammonium group. The alkyl groups on the nitrogen atom of the quaternary ammonium group are preferably lower alkyl groups, for example $C_1$–$C_{10}$ alkyl groups, and more preferably $C_1$–$C_4$ alkyl groups. The resin may be in bead form. The size of the beads are preferably from about 20 to 200 mesh.

Appropriate stabilizing agents should serve to release trialkylamine into the dye circulation stream which may then serve as a singlet oxygen quencher, radical scavenger, and triplet quencher. Examples of such trialkylamines include trimethylamine and tri-n-butylamine. The higher molecular weight trialkylamines do not escape from the dye reservoir as readily as the lower molecular weight trialkylamines. Another preferable function which is additionally or alternatively served by an appropriate stabilizing agent is as a reducing agent for carbonyl compounds which are formed from the excited dye interacting with the dye circulation solvent, since these materials apparently interfere with stimulated emission of the dye in the laser.

A specific example of a stabilizing agent useful in the filter cartridge of the present invention is a resin bound borohydride stabilizing agent. The resin may be a commercially available one, such as divinylbenzene cross-linked poly(aminomethylstyrene) with the amino groups permethylated to make trimethylammonium groups and with borohydride as the anion, i.e. counter ion. This resin is disclosed in U.S. Pat. No. 4,107,099 to Hedge which is incorporated herein by reference. This resin is available from Aldrich Chemical Co., Milwaukee, Wis. A monomeric unit of this stabilizing agent is shown below in formula (I).

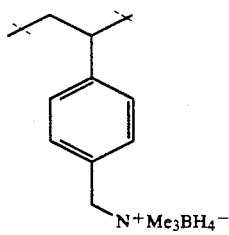

formula (I)

Another example of a stabilizing agent useful in the present invention is a resin bound borohydride stabilizing agent capable of releasing tri-n-butylamine into the dye circulation stream. Such a stabilizing agent is readily synthesized using conventional methods known to those skilled in the art. For example, the synthesis may involve reaction of divinylbenzene cross-linked chloromethylpolystyrene with tri-n-butylamine followed by exchange of the chloride ion for borohydride with sodium borohydride so as to form a stabilizing agent with a monomeric unit as indicated below in formula (II).

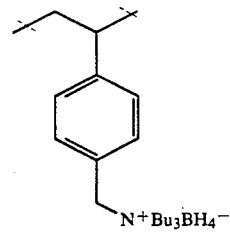

formula (II)

Such a synthesis may be based on procedures outlined in E. German Patent No. 24,439 (1962) to H. Mueller and British Patent No. 895,977 (1960) owned by Permutit, Co., Ltd.

Other Examples of stabilizing agents which may be employed in the filter cartridge of the present invention include crosslinked quaternary ammonium polystyrene anion exchange resins such as Dowex 1X8-50 (Cl) ion exchange resin manufactured by Dow Chemical Co., Inc. and Amberlite IRA-400 (Cl) ion exchange resin manufactured by Rohm and Haas, Inc. The basic structure of a monomeric unit of such resins is shown below in formula (III).

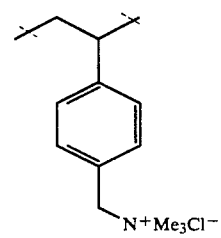

formula (III)

Figure 3:
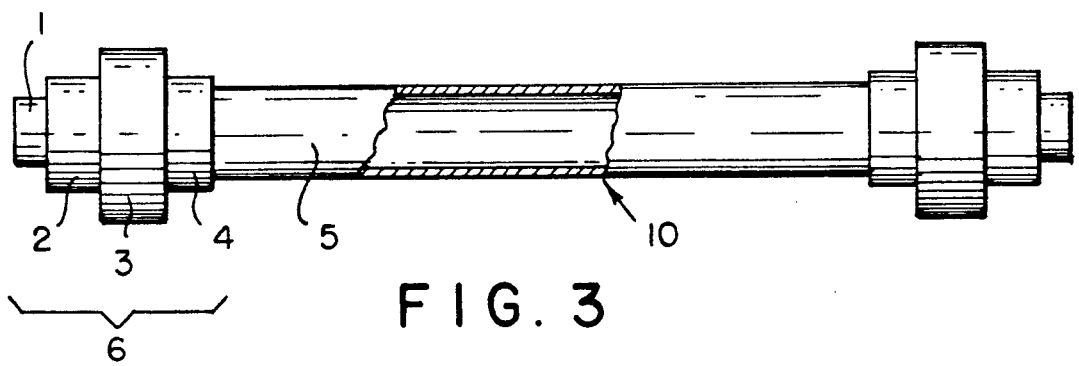
FIG. 3 is a side view of a first embodiment of the filter cartridge according to the present invention.

The structure of the filter cartridge of the present invention is designed to conveniently be inserted into the dye circulation stream, such as in the dye solution supply line, of a dye laser. The cartridge may also be adapted to be contained in the dye reservoir in the form of a porous structure, such as a stainless steel screen case containing the stabilizing agent therein, such that the dye solution would be in continuous contact with the stabilizing agent. A first embodiment of a structure of a filter cartridge in accordance with the present invention is shown in FIG. 3. The filter cartridge 10 includes a central filter section 5 which may be in the shape of tube formed from appropriate materials, such as plastic or metal, e.g. polyvinyl chloride (PVC) or Delrin plastic and stainless steel. The central filter section 5 should have an appropriate volume to accommodate the circulating dye in various laser types and any expansion of the stabilizing agent, for example from about 5 to 2000 mL, preferably from about 10 to 20 mL. The embodiment illustrated in FIG. 2 includes a central filter section 5 formed from commercially available, threaded PVC pipe with an internal diameter of 1.4 cm, a length of 13 cm, and a cartridge volume of 20 mL so as to allow for a stabilizing agent capacity of about 10 grams.

Also shown in FIG. 3 are means for connecting the filter cartridge 10 to the dye circulation stream line of the dye laser, which include an outer portion 2 and an inner portion 4 of a commercially available universal adaptor 6. A collar 3 connects the outer and inner portions of the adaptor. Disposed within the collar 3 and between the outer and inner portions of the adaptor are a double O-ring seal and a stabilizing agent bed support screen (not shown). A reducing adaptor 1 may be connected to the outer portion 2 of the universal adaptor 6. The universal adaptor 6 and reducing adaptor 1 may be formed from materials such as plastic or metal, e.g. PVC or silicone. The O-ring seals may be formed from appropriate sealing materials, such as rubber, e.g. Viton or silicone. The stabilizing bed support screen may be formed from stainless steel or high density polyethylene and is commercially available from hardware or plastic supply companies. The screen material must have smaller holes than then bead diameter unless the screen is used to hold filter paper in place.

Figure 4:
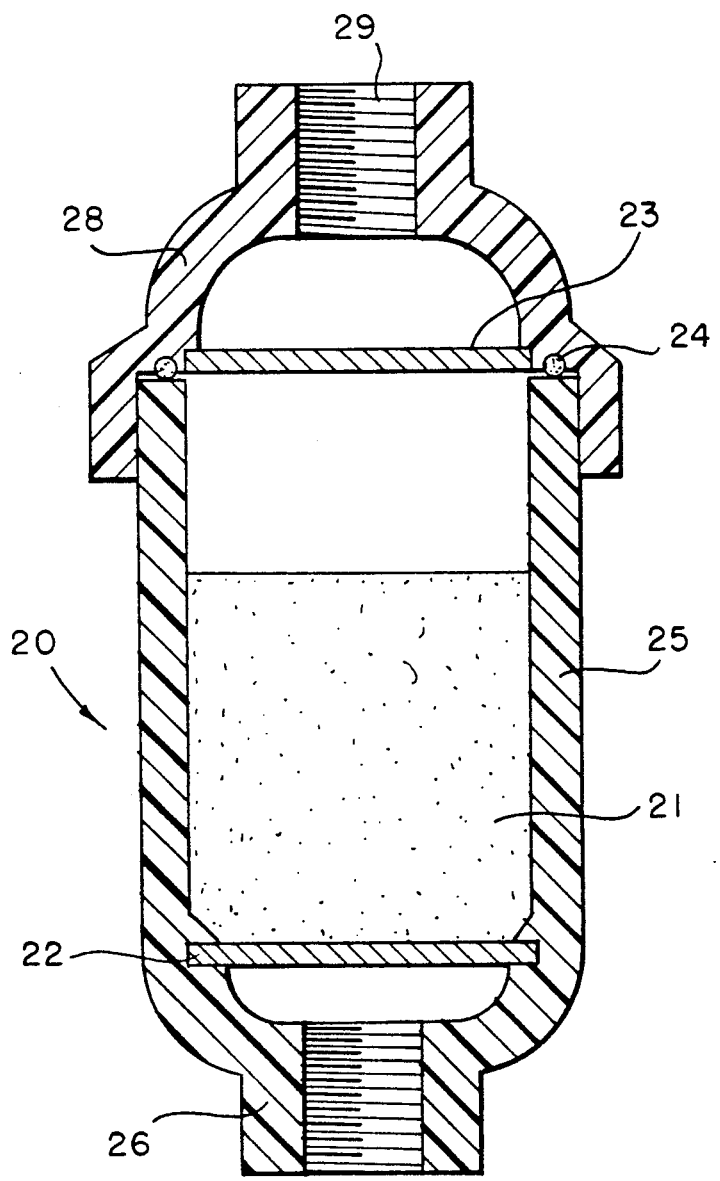
FIG. 4 is a cutaway view of a second embodiment of the filter cartridge according to the present invention.

A cutaway view of a second embodiment of the present invention is illustrated in FIG. 4. A filter cartridge 20 includes a central filter section 25 which contains stabilizing agent beads 21. The central filter section 25 may be formed from appropriate materials such as plastic or metal, e.g. Delrin, PVC plastic or stainless steel, and has a volume of from about 5 to 2000 mL, preferably from about 10 to 20 mL. The central filter section has a length of 4.1 cm and a diameter of 2.5 cm for a volume of about 20 mL which accommodates stabilizing agent in an amount of about 10 grams. The central filter section 25 includes a first bed support screen 22 disposed at one end thereof. The first screen 22 may be integrally connected within the filter section 25. A second bed support screen 23 is disposed at the other end of the central filter section. The bed support screens, which may be 1 to 5 cm in diameter, may be formed from stainless steel or plastic such as high density polyethylene and may be commercially obtained from hardware or plastic supply companies. In the embodiment illustrated in FIG. 4, the central filter section 25 includes a female threaded first end 26 for receiving the end of a dye circulation stream line via appropriate adapters and fittings and a male threaded second end 27 for receiving a detachable cartridge end section 28 which includes a female threaded portion 29. As illustrated in FIG. 4, an optional O-ring seal 24 may be inserted to make the connection between the central filter section 25 and the end section 28 leakproof. The interior diameters of the female threaded portions of the central filter section first end 26 and the cartridge end section 28 allow for connection to the dye circulation stream line of the dye laser. For example, the interior diameters may be 3/8" with a 1" regular hexagonal exterior.

EXAMPLES

Instruments, Methods and Materials. Laser power measurements were made with a Scientech (Boulder, CO) model 362 power energy meter connected to a calibrated Scientech 36-0001 disc calorimeter. Ultraviolet and visible absorption spectra were recorded with a Hewlett-Packard (Avondale, Pa.) 8450A or 8452A diode array spectrophotometer using 1 cm square quartz cuvettes. Analytical high performance liquid chromatography (HPLC) was performed with a Hewlett-Packard 1090 liquid chromatograph equipped with a diode array detector and data processing unit. The column was 100 mm×2.1 mm with Hewlett-Packard reverse phase (C18) 5 μm packing material The samples were eluted with an isocratic solvent mixture of 45% acetonitrile/55% water (v/v) at 0.3 mL/min. Fischer Scientific (Denver, Co.) brand HPLC grade acetonitrile and triply distilled water were filtered through a 0.2 μm pore diameter membrane before use as HPLC solvents.

The detector was set to monitor at positions of maximum absorbance of the analytes. Constant volume injections of 5 μL were made and the results were interpreted by comparison with detector responses to analysis of standard solutions. Co-injections of authentic materials with analytical samples were used to verify their identity.

Absolute and 95% ethanol were USP grade. Acetaldehyde from Aldrich Chemical (Milwaukee, Wis.) was distilled prior to use. Laser grade dyes were used as received from Exciton (Dayton, Ohio) or Eastman Kodak (Rochester, N.Y.). Borohydride exchange resin (BER) was used as received from Aldrich Chemical or prepared either from Dowex 1X8-50 (Cl) ion exchange resin (Dow Chemical, Midland, Mich.) or from Amberlite IRA-400 (Cl) ion exchange resin (Rohm and Haas, Philadelphia, Pa.). As described above, BER includes a commercially available resin in the form of a divinylbenzene crosslinked poly(aminomethylstyrene) with the amino groups permethylated to make trimethylammonium groups and borohydride as the anion. Dowex 50W-X8 (H+) was used as acidic ion exchange resin. All other chemicals were obtained from Aldrich Chemical or Eastman Kodak.

Preparation of BER from the chloride form of an ion exchange resin was done by initial conversion of the resin to its hydroxide form by washing with an aqueous solution containing four equivalents of sodium hydroxide, then rinsing with distilled deionized water. The chloride form was then regenerated by washing with four equivalents of aqueous hydrogen chloride and again rinsing with water. The borohydride form of the resin was then generated by washing with an aqueous solution containing 4 equiv. of sodium borohydride and 0.1 equiv. of sodium hydroxide as a stabilizer. The resin was then rinsed with several bed volumes of distilled deionized water, followed by absolute ethanol rinses to remove water. The damp BER was rotary evaporated until it was a free flowing solid, then dried thoroughly under vacuum.

Excimer Laser Pumped Dye Laser Experimental Setup.

An excimer laser pumped dye laser setup was arranged as schematically illustrated in FIG. 1. A Lambda Physik (Acton, Mass.) EMG 101 excimer laser was used to pump a single oscillator cell dye laser with 308 nm light at 52 to 82 mJ/pulse and 10 Hz. For use as a xenon chloride excimer laser, the gas chamber of the excimer laser was filled with the standard mixture of 60 mbar xenon, 80 mbar of 5% hydrogen chloride in helium, and 2360 mbar helium. The pump light was focused with a fused silica cylindrical lens onto a Lambda Physik FL46/2 quartz dye cell of 2 cm square internal dimension. A maximum reflecting 25 mm diameter concave mirror with a 3 m radius of curvature was used as back reflector, but no output coupler was placed on the beam exit side of the dye cell. Excimer laser power was measured with the calorimeter in the beam path 7 cm from the beam exit, and dye laser power was measured with the calorimeter aligned at 6 cm from the exit side of the dye cell. Power outputs from the excimer laser and the dye laser were measured in watts, but dye laser output was reported in percent efficiency to correct for changes in the excimer (pump) laser intensity. The dye circulation system consisted of a stoppered 100 mL 3 neck flask as a closed reservoir, a Micropump (Concord, Calif.) 120-601-10A pump, a stainless steel or polypropylene filter housing with a Balston (Lexington, Mass.) grade BH filter tube, and 6 mm internal diameter Eastman Poly-Flo polyethylene tubing. The total capacity of the dye system was 150 mL of dye solution. For laser stabilization experiments 3 g of borohydride exchange resin were contained in a Balston grade BH filter tube closed at each end with glass wool, all held in a stainless steel or polypropylene filter housing and inserted in the dye stream between the pump and existing particulate filter. Each experiment employed a dye solution of 140 mL of $5 \times 10^{-3}$M coumarin 460 in absolute ethanol which was continuously purged with prepurified argon when oxygen was being excluded. Dry, aldehyde-free ethanol was prepared by addition of 10 g of potassium hydroxide and 10 g of zinc for each liter of absolute ethanol before distillation under a nitrogen atmosphere. The dye circulation reservoir was immersed in a constant temperature bath maintained at 25° C. to control the dye temperature. Before the circulation system was charged with dye, it was cleaned to remove impurities from previous experiments by rinsing with two volumes each of 0.1M acetic acid, water, then ethanol. Analysis of the dye mixture during laser operation was performed by removing 3 mL of dye solution through a septum with a syringe and measuring the optical density from 190 to 550 nm then returning the sample to the dye reservoir.

Flashlamp Pumped Dye Laser Experimental Setup. A flashlamp pumped dye laser was assembled as illustrated in FIG. 2. A Phase-R (New Durham, N.H.) DL-2100B dye laser with the DL-15BY 15 mm diameter coaxial flashlamp was used for all flashlamp pumped dye laser experiments. The laser was operated at 14 KV charging voltage and 0.5 Hz repetition rate with 4 psi air on the spark gap to the high voltage trigger. The appropriate maximum reflector and output coupler mirrors were aligned with the beam path on either end of the flashlamp, but no wavelength tuning was done. For power measurements the calorimeter was situated in the beam axis 16.5 cm from the output coupler, and the total energy of ten laser pulses was read in joules. Dye temperature was maintained at 0.2° C. below the triax solution temperature and the absolute temperature was between 18° and 20° C. The triax solution was 1.5 L of 0.5 g/L aqueous caffeine used as an ultraviolet filter, except for experiments on the dye LD 425 in which case 1.5 L of distilled water was used. The dye and triax solutions were circulated with separate 10 psi pumps. A 0.3 μm glass fiber filter in a Phase-R filter housing inline between the dye circulator and flashlamp was used to remove particulates and air bubbles from the dye solution. Transport tubing for dye and triax solutions was 1 cm internal diameter Teflon. For each experiment 1.5 L of $1.5 \times 10^{-4}$M dye ($2.0 \times 10^{-4}$ for LD 425 experiments) in absolute ethanol was employed. Before the fresh dye was introduced, the dye circulation system was carefully cleaned to remove traces of dye, stabilizer, and breakdown products from previous experiments. This cleaning process consisted of several flushing steps, each followed by draining the system. Starting with two flushes with 1.5 L of 0.1M acetic acid and two flushes with 1.5 L of distilled water, the basic impurities were removed. Two subsequent flushes with 1 L of 95% ethanol and a final rinse with 1 L of absolute ethanol removed traces of water. For stabilized laser experiments 4.6 to 2.88 g of borohydride exchange resin were contained in a modified Phase-R filter housing which was put in place of the regular inline filter in the dye stream. The modified housing had a screen-enclosed 0.3 μm glass fiber filter as a bed support on each end of its 4.1 cm diameter X 4.0 cm high annular space.

A sample of the circulating dye was periodically taken by removing 3 mL of the dye solution through a septum with a syringe. The sample was immediately transferred to a cuvette and the optical density from 190 to 550 nm was measured against an empty cell blank. Optical density at the maximum absorbance wavelength and the lasing wavelength of the dye were followed to assess the concentration and clarity of the dye solution. After this measurement the sample was transferred to a labelled glass vial and capped for later HPLC analysis when the dye concentration and any formation of photoproducts were determined.

The acetaldehyde concentration was determined by 2,4-dinitrophenylhydrazine (2,4-DNP) derivatization and calibrated HPLC analysis of the resulting acetaldehyde 2,4-dinitrophenylhydrazone. A stock solution of 2,4-DNP derivatizing reagent was made of 18 mL methanol, 5 mL 18M sulfuric acid, and 0.50 g 2,4-dinitrophenylhydrazine. Each 3 mL sample containing acetaldehyde in ethanol was derivatized by mixing with 0.2 mL of 2,4-DNP reagent stock solution and allowing 5 h to react before HPLC analysis was done. To ensure that the derivatization reaction proceeded to completion in the 5 h allowed, a sample of $8.0 \times 10^{-4}$M acetaldehyde was derivatized and analyzed periodically by HPLC, showing that in 0.3 h 55% had reacted, in 0.5 61% had reacted, and in 55 h 99% had reacted. The progress in the first 0.5 h of reaction suggested that it reached completion in under 3h.

In order to calibrate the HPLC detector response, standard acetaldehyde in 95% ethanol solutions of concentrations $2.6 \times 10^{-5}$M, $1.0 \times 10^{-4}$M, $4.5 \times 10^{-4}$M, and $2.1 \times 10^{-3}$M were derivatized and analyzed by HPLC. The resulting peak areas for the derivative were used to establish the following relationship: {acetaldehyde concentration (M)} = $\{8.5 \times 10^{-8}\} \times$ {HPLC peak area} + $\{4.2 \times 10^{-5}\}$ with a correlation coefficient ($R^2$) of 1.00.

Comparative Example 1

Figure 5:
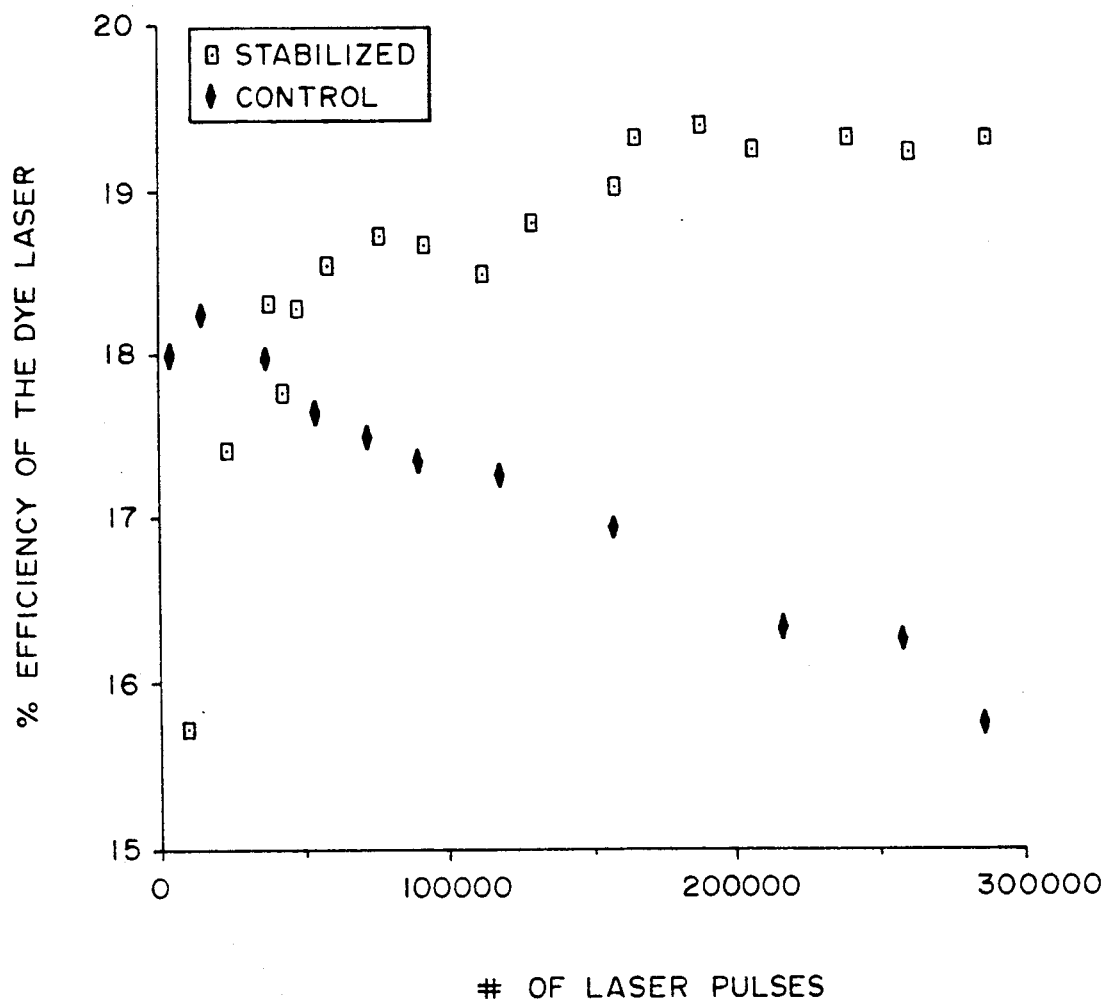
FIG. 5 is a graph showing the output efficiency of an excimer laser pumped Coumarin 460 dye laser with (stabilized) and without (control) the filter cartridge.
Figure 6:
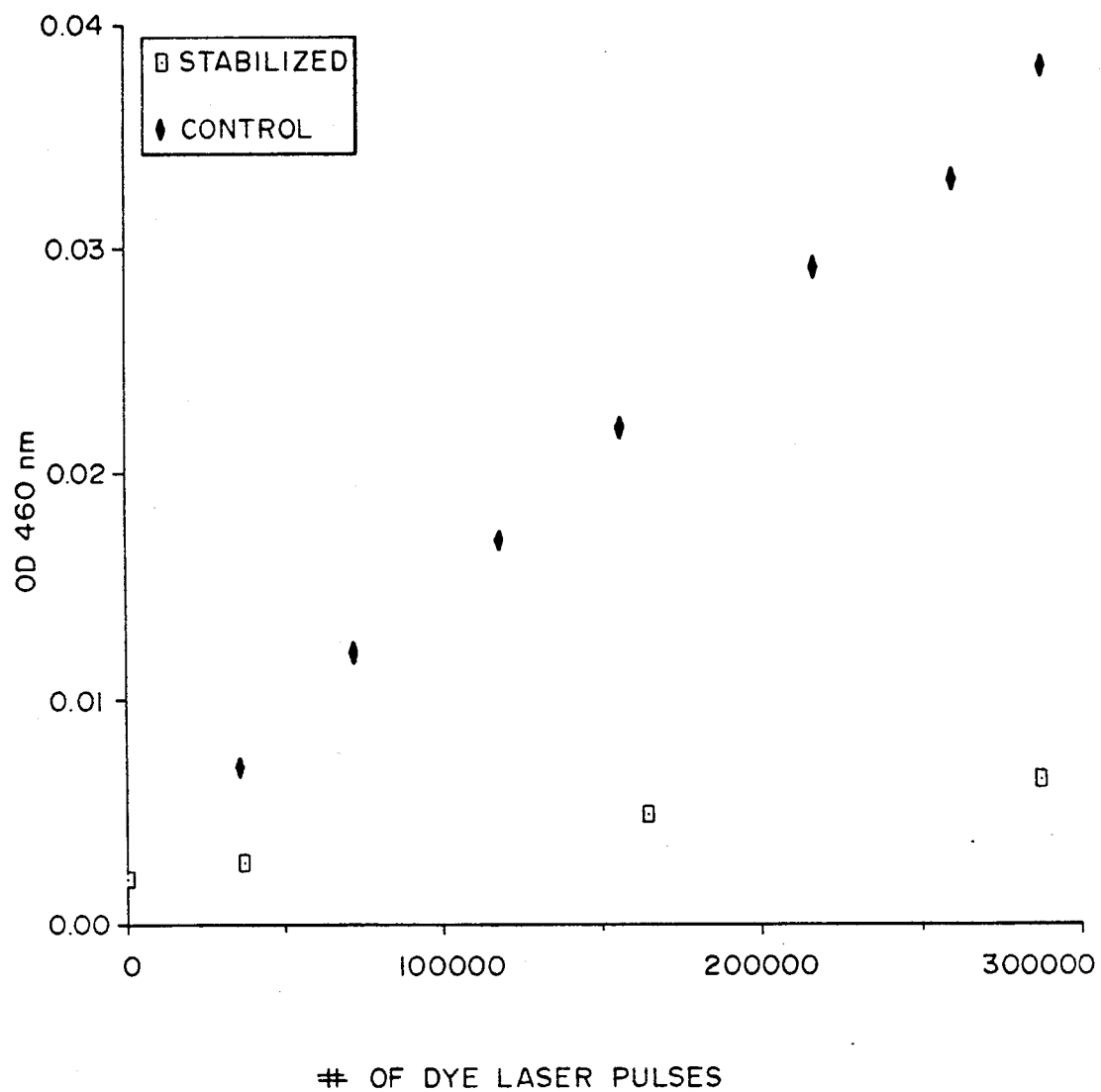
FIG. 6 is a graph showing the optical density of an excimer laser pumped Coumarin 460 dye laser with (stabilized) and without (control) the filter cartridge.

Unstabilized Coumarin 460 Dye Solution in an Excimer Laser Pumped Dye Laser. A particulate filter cartridge was inserted between the pump and the dye cell in the dye laser circulation system as illustrated in FIG. 1. The cleaned dye system was charged with 140 mL of air saturated $5 \times 10^{-3}$M coumarin 460 in distilled absolute ethanol. This solution was circulated for 30 minutes before lasing to allow for temperature equilibration to 25° C. The dye laser was pumped by 57.9 to 52.1 mJ/pulse of 308 nm excimer laser power resulting in 10.5 to 8.2 mJ/pulse of dye laser output which corresponded to a conversion efficiency of 18.3 to 15.7%. The optical density of the dye solution was measured 8 times during the laser operation. The laser was operated at 10 Hz for 290,000 pulses, and the performance of the dye laser (compared with the stabilized laser experiment) was related to dye laser efficiency as shown in FIG. 5 and to optical density of the dye solution at the lasing wavelength of coumarin 460 as shown in FIG. 6.

EXAMPLE 1

Borohydride Exchange Resin Stabilized Coumarin 460 Dye solution in an Excimer Laser Pumped Dye Laser. A particulate filter cartridge was inserted between the pump and the dye cell in the dye laser circulation system. Next, a filter packed with 3 g of borohydride exchange resin was placed in a stainless steel filter housing between the pump and the particulate filter (FIG. 1). The cleaned dye system was charged with 140 mL of air saturated $5 \times 10^{-3}$M coumarin 10 460 in distilled absolute ethanol. This solution was circulated for 30 minutes before lasing to allow for temperature equilibration to 25° C. The dye laser was pumped by 60.5 to 57.0 mJ/pulse of 308 nm excimer laser power resulting in 9.5 to 11.2 mJ/pulse of dye laser output which corresponded to a conversion efficiency of 15.7 to 19.4%. The optical density of the dye solution was measured 4 times during the laser operation. The laser was operated at 10 Hz for 290,000 pulses, and the performance of the dye laser (compared with the unstabilized laser experiment) was related to dye laser efficiency as shown in FIG. 5 and to optical density of the dye solution at the lasing wavelength of coumarin 460 as shown in FIG. 6.

COMPARATIVE EXAMPLE 2

Figure 7:
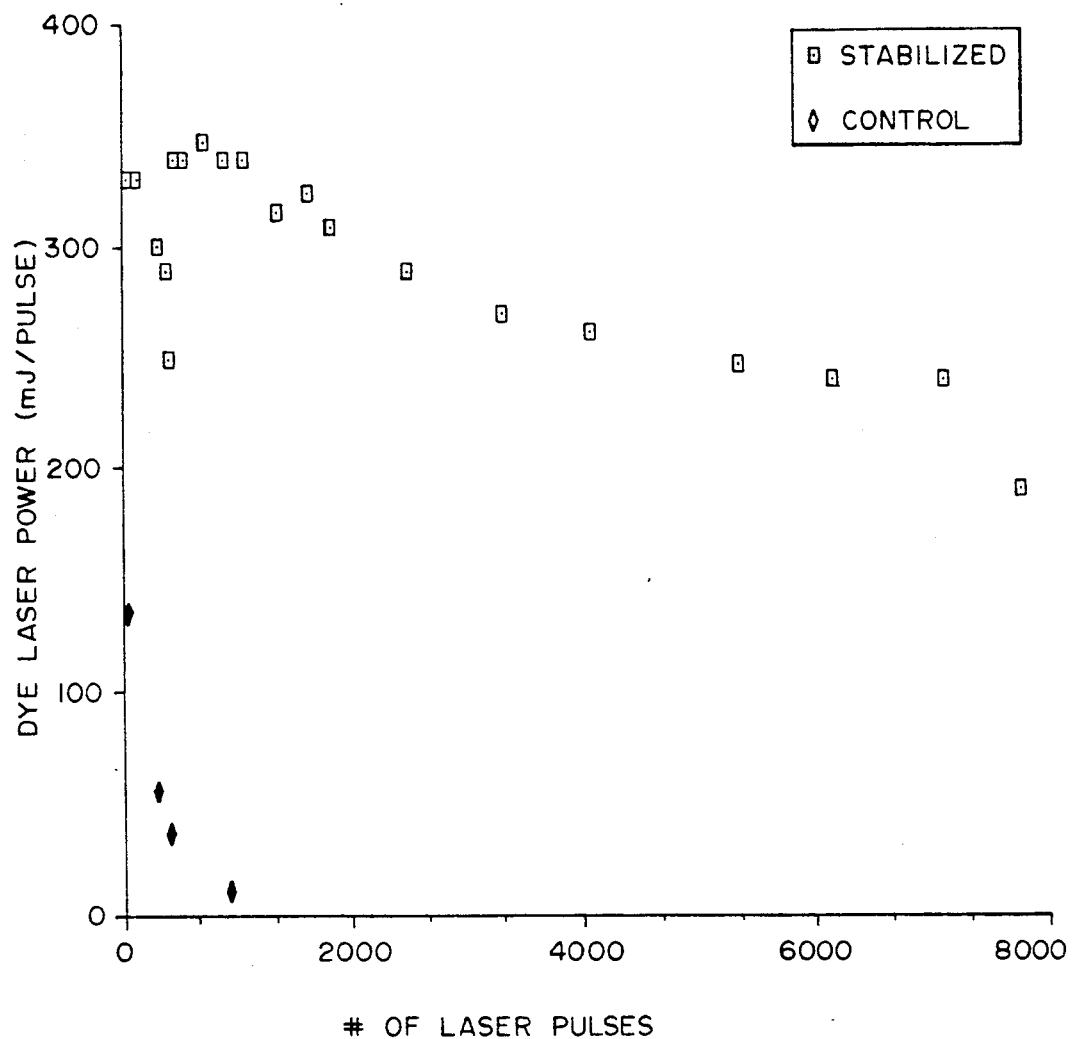
FIG. 7 is a graph showing the dye laser power output of a flashlamp pumped Coumarin 460 dye laser with (stabilized) and without (control) the filter cartridge.
Figure 8:
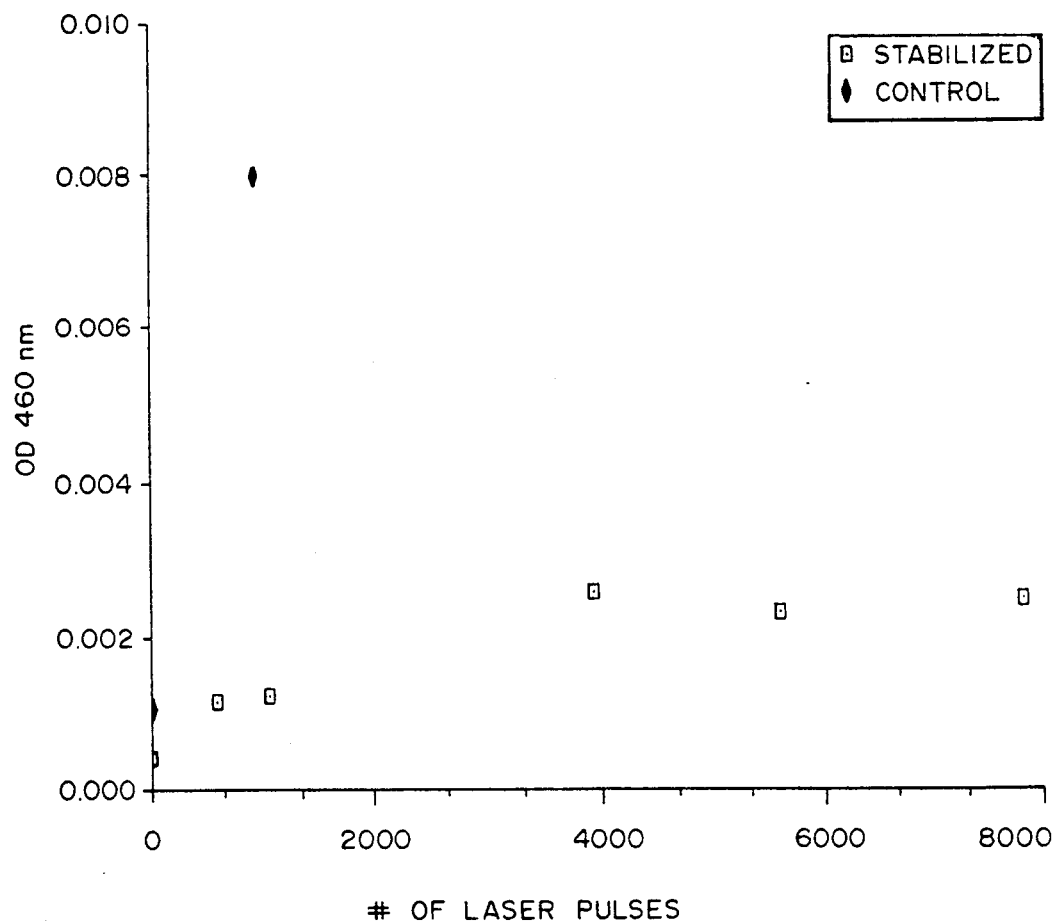
FIG. 8 is a graph showing the optical density at 460 nm of a flashlamp pumped 460 dye laser solution with (stabilized) and without (control) the filter cartridge.
Figure 9:
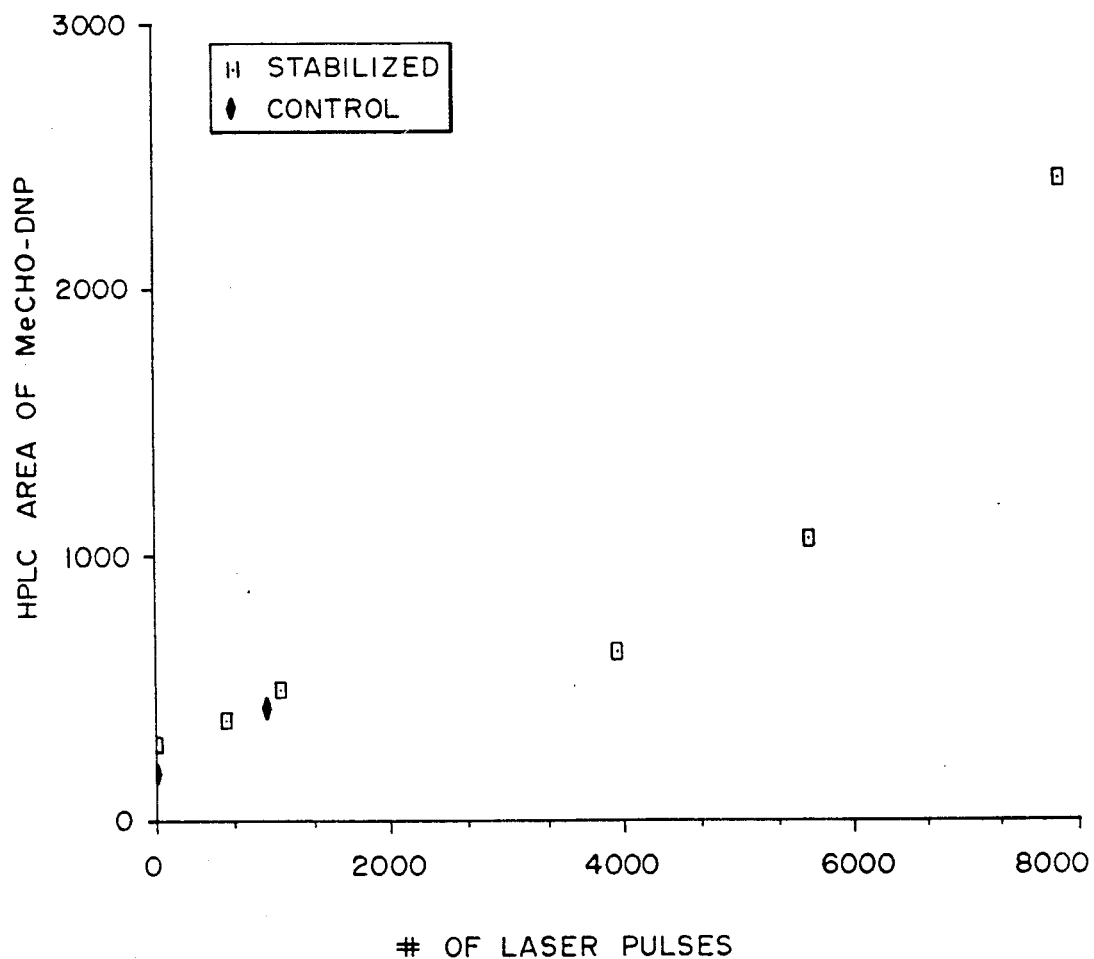
FIG. 9 is a graph showing the results of high performance liquid chromatographic (HPLC) analysis with regard to laser performance for a flashlamp pumped Coumarin 460 dye laser with (stabilized) and without (control) the filter cartridge.
Figure 10:
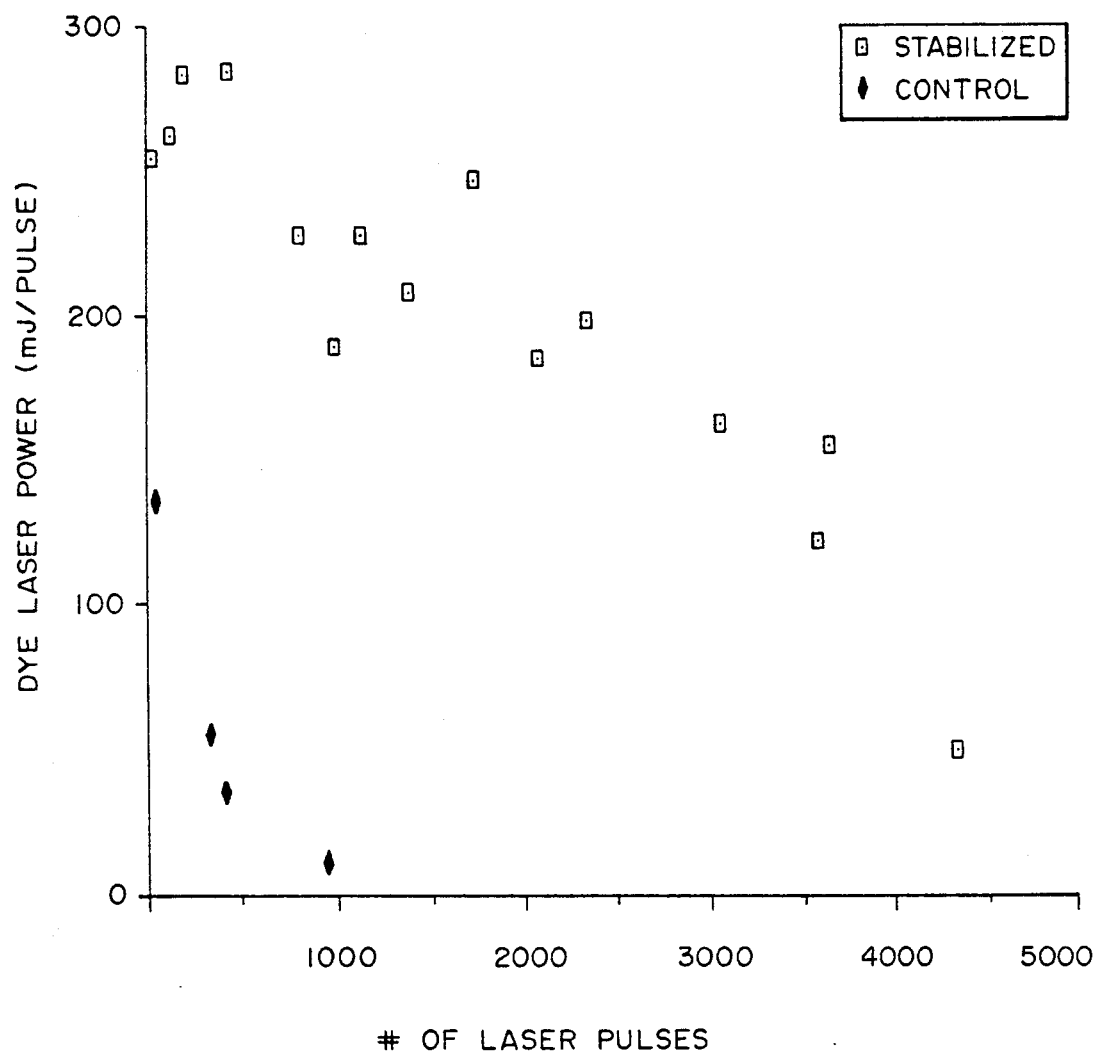
FIG. 10 is a graph showing the dye laser power output of flashlamp pumped Coumarin 460 dye laser with (stabilized) and without (control) the filter cartridge.
Figure 11:
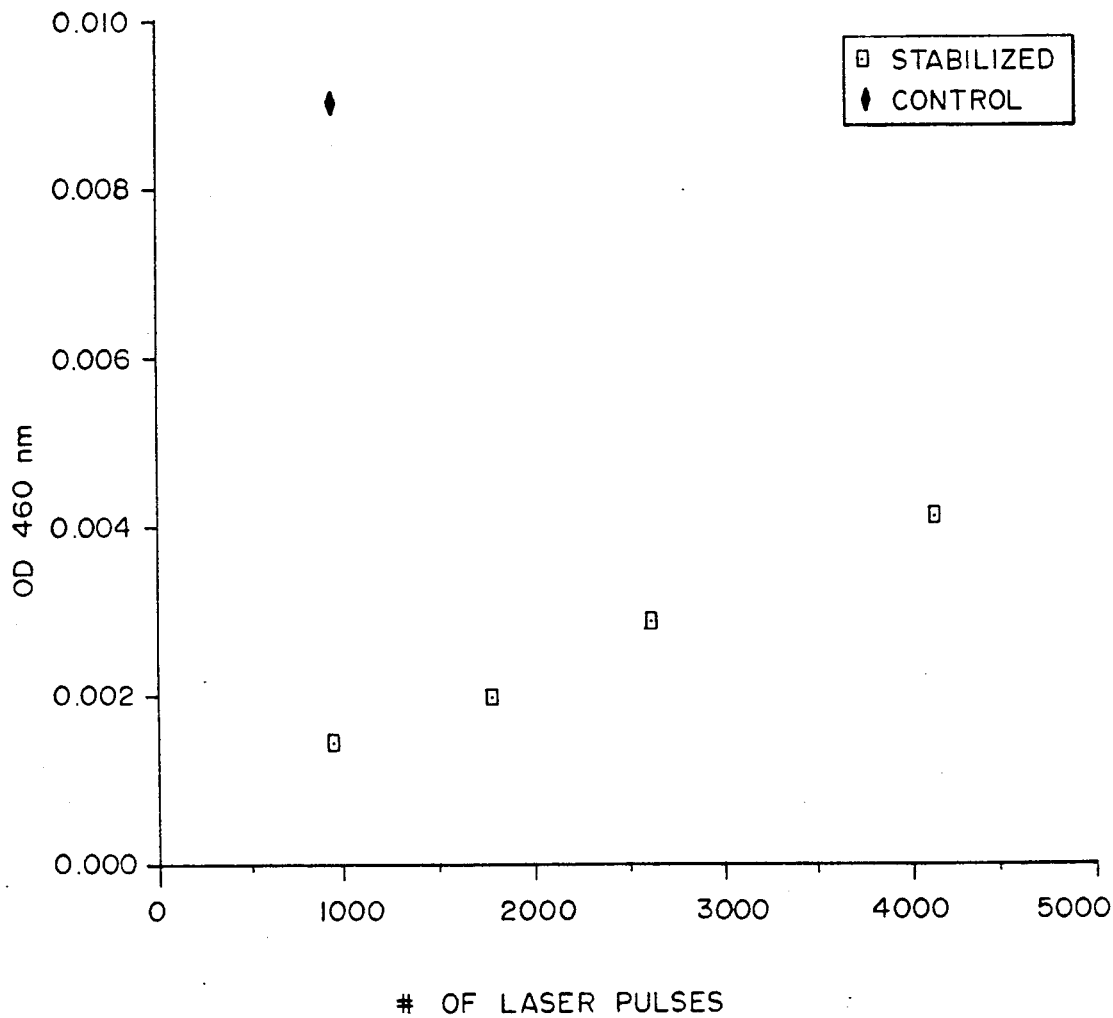
FIG. 11 is a graph showing the optical density at 460 nm of a flashlamp pumped Coumarin 460 dye laser solution with (stabilized) and without (control) the filter cartridge.

Unstabilized Coumarin 460 Dye Solution in a Flashlamp Pumped Dye Laser. A particulate filter was installed in the Delrin filter housing between the circulator pump and the flashlamp in the Phase-R dye laser circulation system as illustrated in FIG. 2. The cleaned dye system was charged with 1.5 L of air saturated $1.5 \times 10^{-4}$M coumarin 460 in absolute ethanol. The triax solution was 1.5 L of 0.5 g/L caffeine in distilled water. The solutions were temperature equilibrated such that the dye solution was 0.2° C. colder than the triax solution and the absolute temperature was 18° to 20° C. The dye laser was charged with 14 KV on the high voltage triggering circuit resulting in a laser output intensity of 135 to 10 mJ/pulse. The optical density of the dye solution was measured 2 times during the laser operation by removing a 3 mL sample and obtaining a UV/vis spectrum. The sample was stored for later HPLC analysis. The previously described method was employed to determine acetaldehyde concentration in the 2 samples. The laser was operated at 0.5 Hz for 1000 pulses, and the performance of the dye laser (compared with the stabilized laser experiments) was related to dye laser output as shown in FIGS. 7 and 10, to optical density of the dye solution at the lasing wavelength of coumarin 460 as shown in FIGS. 8 and 11, and to acetaldehyde concentration as shown in FIG. 9.

EXAMPLE 2

Borohydride Exchange Resin stabilized Coumarin 460 Dye Solution in a Flashlamp Pumped Dye Laser. The modified Phase-R filter housing was loaded with 20 g of borohydride exchange resin and connected in the dye line between the circulator pump and the flashlamp in the Phase-R dye laser circulation system as illustrated in FIG. 2. The cleaned dye system was charged with 1.5 L of air saturated $1.5 \times 10^{-4}$M coumarin 460 in absolute ethanol. The triax solution was 1.5 L of 0.5 g/L caffeine in distilled water. The solutions were temperature equilibrated such that the dye solution was 0.2° C. colder than the triax solution and the absolute temperature was 18° to 20° C. The dye laser was charged with 14 KV on the high voltage triggering circuit resulting in a laser output intensity of 135 to 10 mJ/pulse. The optical density of the dye solution was measured 2 times during the laser operation by removing a 3 mL sample and obtaining a UV/vis spectrum. The sample was stored for later HPLC analysis. The previously described method was employed to determine acetaldehyde concentration in the 2 samples. The laser was operated at 0.5 Hz for 1000 pulses, and the performance of the dye laser (compared with the unstabilized laser experiment) was related to dye laser output as shown in FIG. 7, to optical density of the dye solution at the lasing wavelength of coumarin 460 as shown in FIG. 8, and to acetaldehyde concentration as shown in FIG. 9.

EXAMPLE 3

Borohydride Exchange Resin Stabilized Coumarin 460 Dye Solution in a Flashlamp Pumped Dye Laser Using Acidic Ion Exchange Resin to Control the Release of Amine Vapors. The modified Phase-R filter housing was loaded with 4.6 g of borohydride exchange resin and 0.5 g of Dowex 50W-X8 (H+) ion exchange resin then connected in the dye line between the circulator pump and the flashlamp in the Phase-R dye laser circulation system as illustrated in FIG. 2. The cleaned dye system was charged with 1.5 L of air saturated $1.5 \times 10^{-4}$M coumarin 460 in absolute ethanol. The triax solution was 1.5 L of 0.5 g/L caffeine in distilled water. The solutions were temperature equilibrated such that the dye solution was 0.2° C. colder than the triax solution and the absolute temperature was 18° to 20° C. The dye laser was charged with 14 KV on the high voltage triggering circuit resulting in a laser output intensity of 284 to 50 mJ/pulse. The optical density of the dye solution was measured 5 times during the laser operation by removing a 3 mL sample and obtaining a UV/vis spectrum. The sample was then stored for subsequent HPLC analysis. The laser was operated at 0.5 Hz for 4300 pulses, and the performance of the dye laser (compared with the unstabilized laser experiment) was related to dye laser output as shown in FIG. 10 and to optical density of the dye solution at the lasing wavelength of coumarin 460 as shown in FIG. 11.

COMPARATIVE EXAMPLE 4

Figure 12:
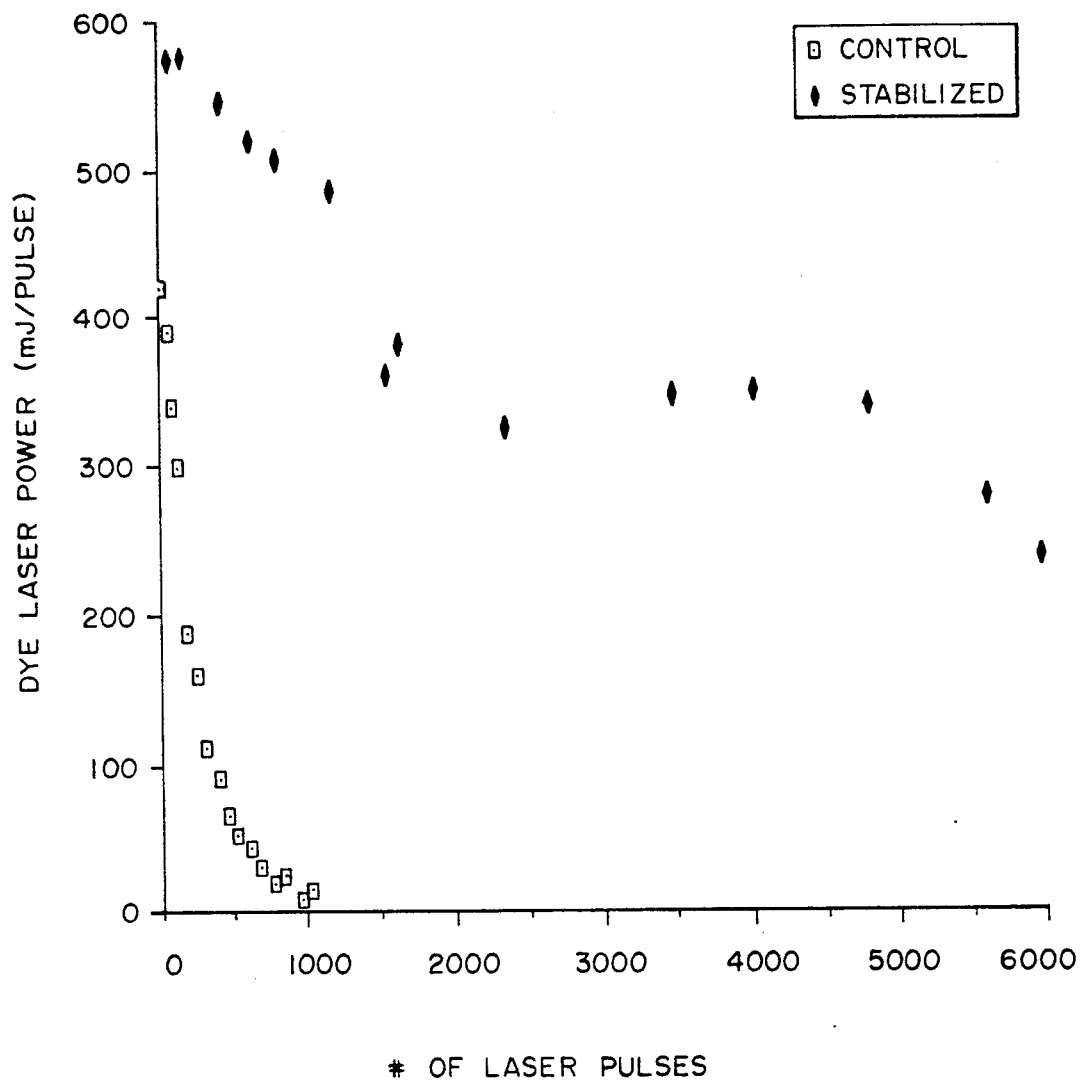
FIG. 12 is a graph showing the dye laser power output of a flashlamp pumped Coumarin 480 dye laser with (stabilized) and without (control) the filter cartridge.
Figure 13:
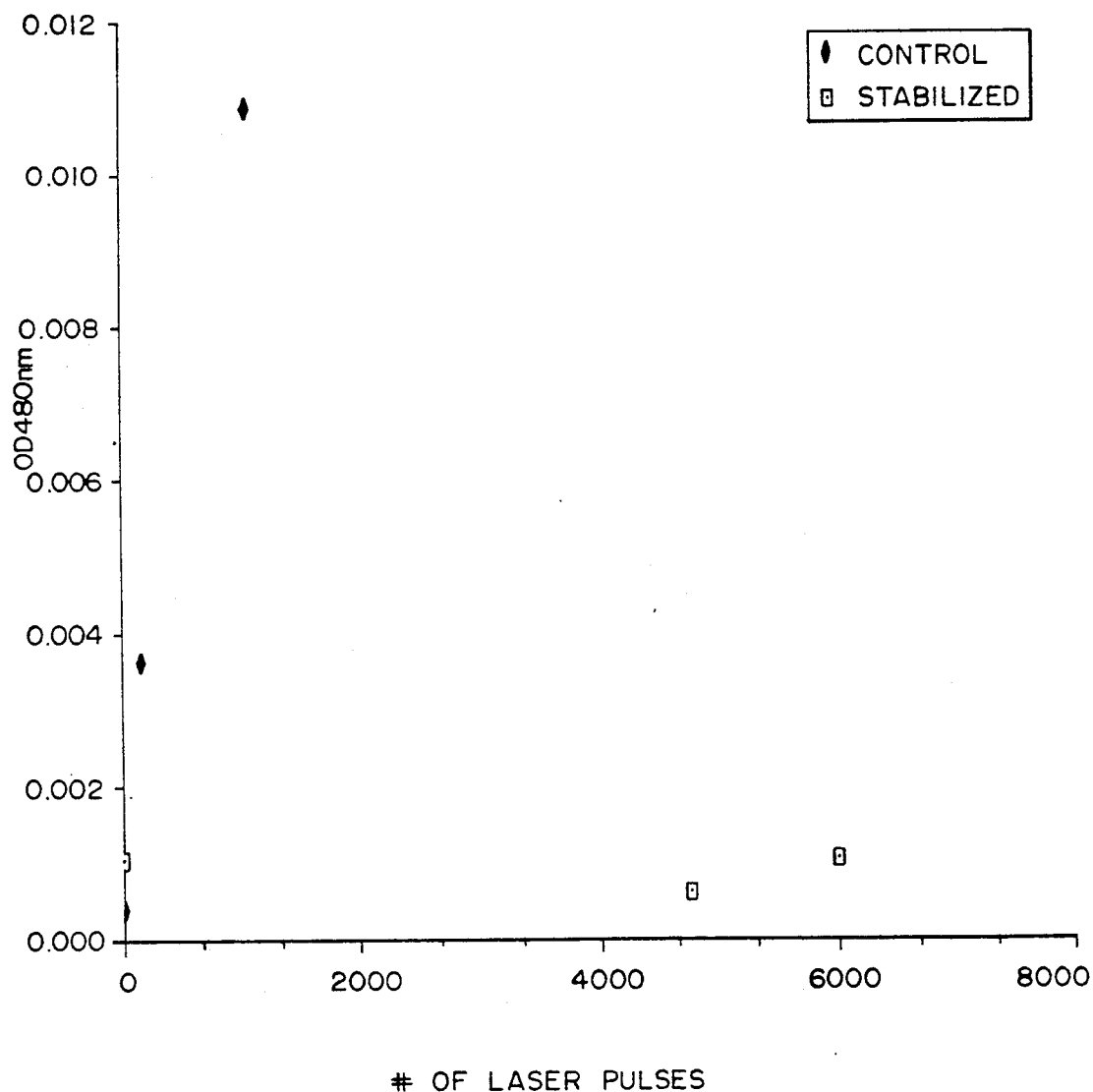
FIG. 13 is a graph showing the optical density at 480 nm of a flashlamp pumped Coumarin 480 dye laser solution with (stabilized) and without (control) the filter cartridge.
Figure 14:
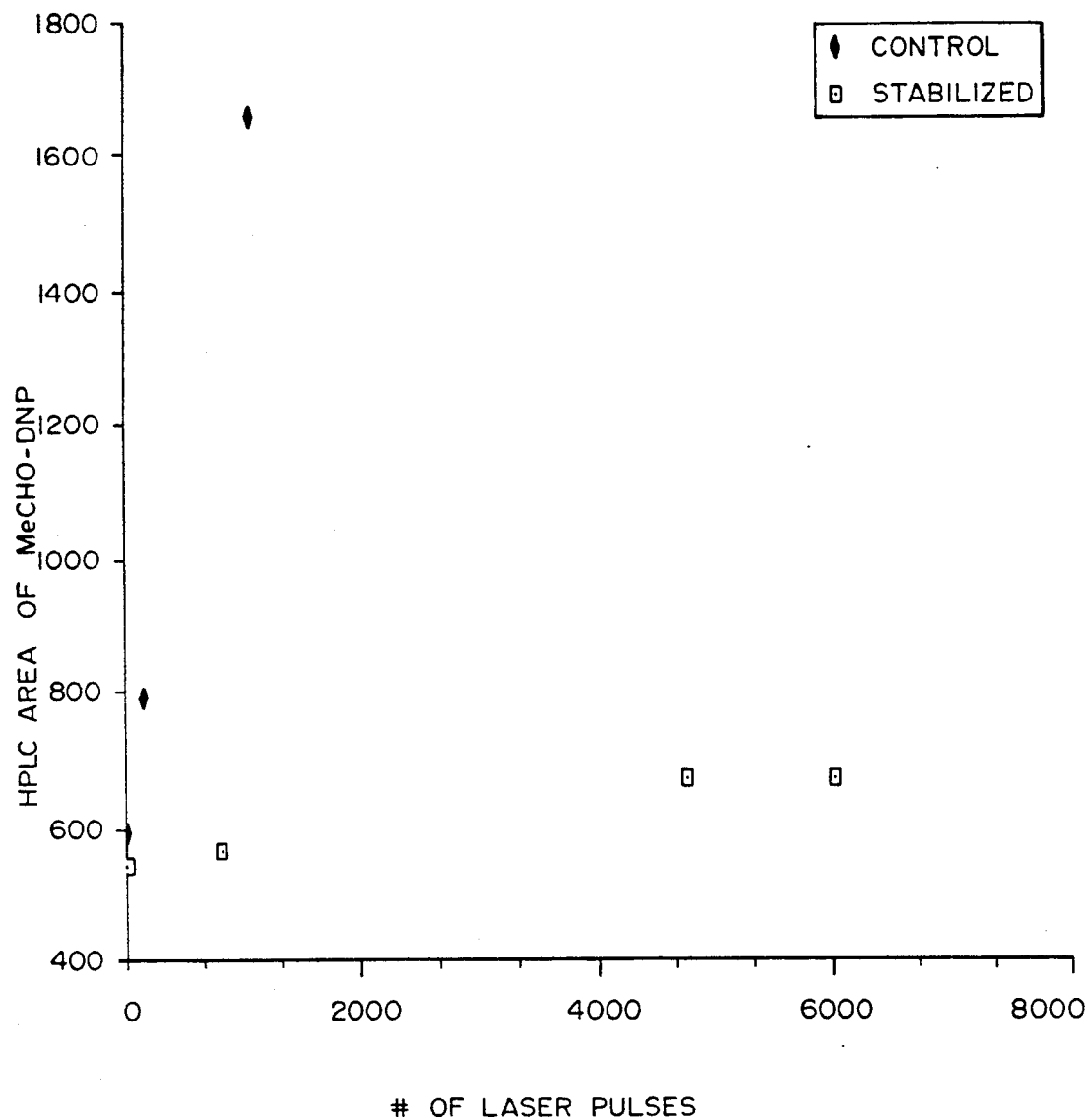
FIG. 14 is a graph showing the results of HPLC analysis with regard to the performance of a flashlamp pumped Coumarin 480 dye laser with (stabilized) and without (control) the filter cartridge.

Unstabilized Coumarin 480 Dye Solution in a Flashlamp Pumped Dye Laser. A particulate filter was installed in the Delrin filter housing between the circulator pump and the flashlamp in the Phase-R dye laser circulation system as illustrated in FIG. 2. The cleaned dye system was charged with 1.5 L of air saturated $1.5 \times 10^{-4}$M coumarin 480 in absolute ethanol. The triax solution was 1.5 L of 0.5 g/L caffeine in distilled water. The solutions were temperature equilibrated such that the dye solution was 0.2° C. colder than the triax solution and the absolute temperature was 18° to 20° C. The dye laser was charged with 14 KV on the high voltage triggering circuit resulting in a laser output intensity of 420 to 11 mJ/pulse. The optical density of the dye solution was measured 3 times during the laser operation by removing a 3 mL sample and obtaining a UV/vis spectrum. The sample was stored for later HPLC analysis. The previously described method was employed to determine acetaldehyde concentration in the 3 samples. The laser was operated at 0.5 Hz for 1000 pulses, and the performance of the dye laser (compared with the stabilized laser experiments) was related to dye laser output as shown in FIG. 12, to optical density of the dye solution at the lasing wavelength of coumarin 480 as shown in FIG. 13, and to acetaldehyde concentration as shown in FIG. 14.

EXAMPLE 4

Borohydride Exchange Resin Stabilized Coumarin 480 Dye Solution in a Flashlamp Pumped Dye Laser.

The modified phase-R filter housing was loaded with 17.5 g of borohydride exchange resin and connected in the dye line between the circulator pump and the flashlamp in the Phase-R dye laser circulation system as illustrated in FIG. 2. The cleaned dye system was charged with 1.5 L of air saturated $1.5 \times 10^{-4}$M coumarin 480 in absolute ethanol. The triax solution was 1.5 L of 0.5 g/L caffeine in distilled water. The solutions were temperature equilibrated such that the dye solution was 0.2° C. colder than the triax solution and the absolute temperature was 18° to 20° C. The dye laser was charged with 14 KV on the high voltage triggering circuit resulting in a laser output intensity of 575 to 240 mJ/pulse. The optical density of the dye solution was measured 4 times during the laser operation by removing a 3 mL sample and obtaining a UV/vis spectrum. The sample was then stored for subsequent HPLC analysis. The laser was operated at 0.5 Hz for 6000 pulses, and the performance of the dye laser (compared with the unstabilized laser experiment) was related to dye laser output as shown in FIG. 12, to optical density of the dye solution at the lasing wavelength of coumarin 480 as shown in FIG. 13, and to acetaldehyde concentration as shown in FIG. 14.

COMPARATIVE EXAMPLE 5

Figure 15:
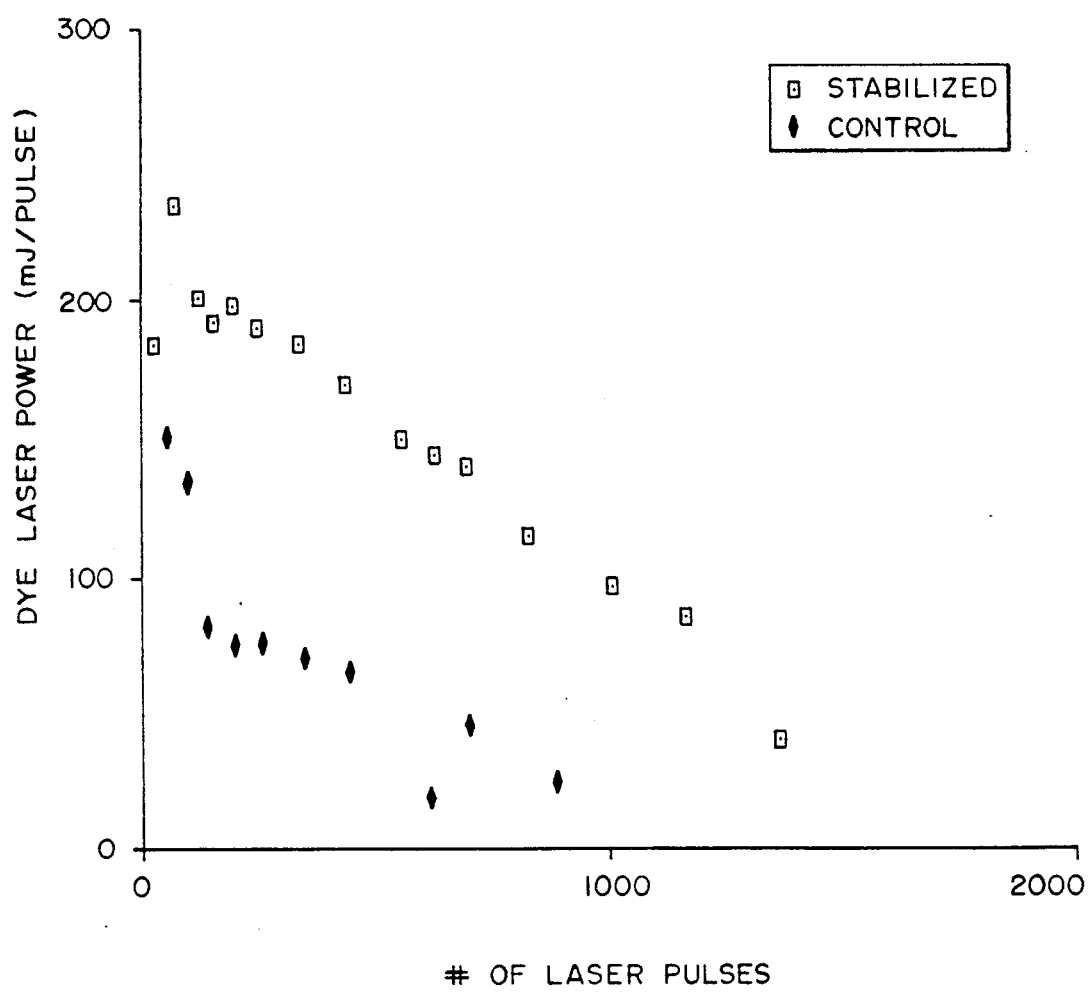
FIG. 15 is a graph showing the dye laser power output of a flashlamp pumped LD 425 dye laser with (stabilized) and without (control) the filter cartridge.
Figure 16:
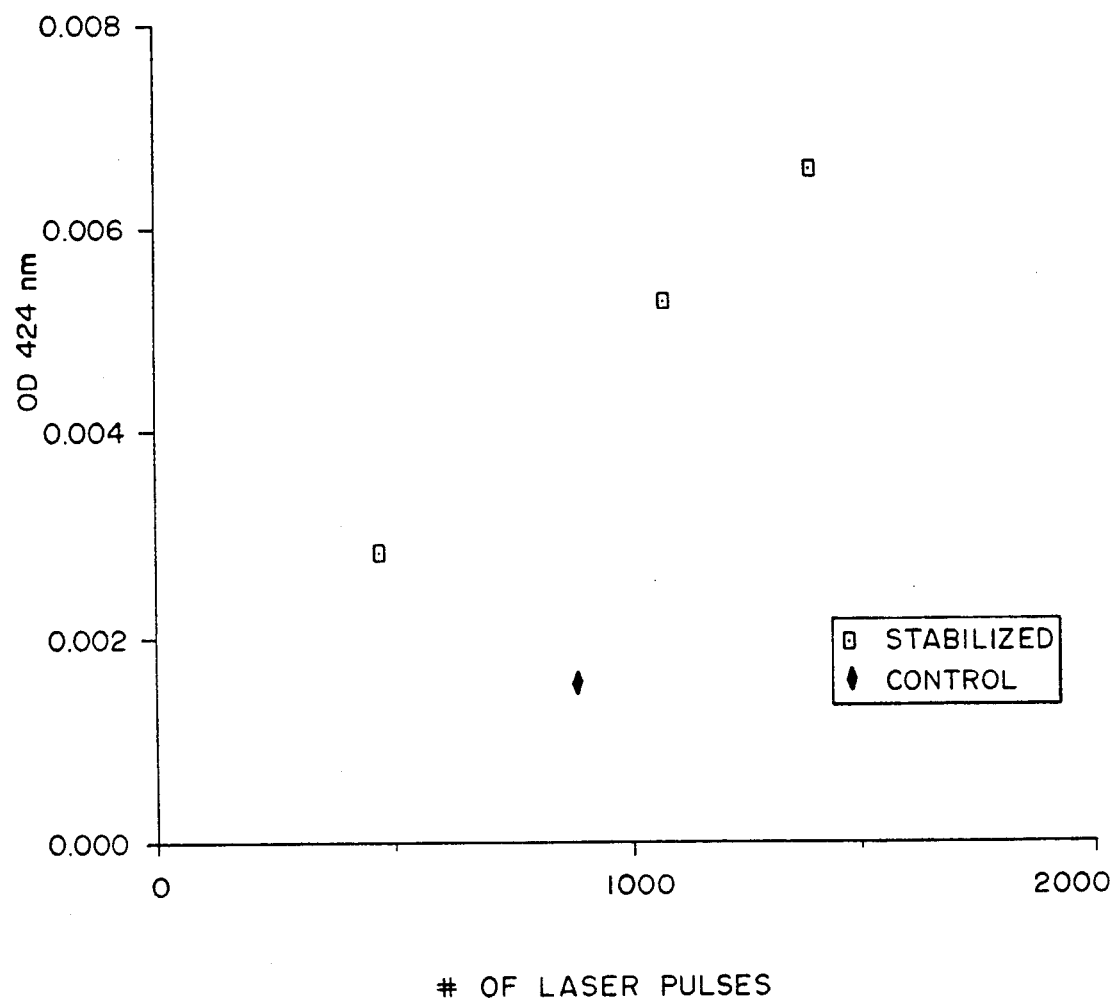
FIG. 16 is a graph showing the optical density at 424 nm of a flashlamp pumped LD 425 dye laser solution with (stabilized) and without (control) the filter cartridge.

Unstabilized LD 425 Dye Solution in a Flashlamp Pumped Dye Laser. A particulate filter was installed in the Delrin filter housing between the circulator pump and the flashlamp in the Phase-R dye laser circulation system as illustrated in FIG. 2. The cleaned dye system was charged with 1.5 L of air saturated $2.0 \times 10^{-4}$M LD 425 in absolute ethanol. The triax solution was 1.5 L of distilled water. The solutions were temperature equilibrated such that the dye solution was 0.2° C. colder than the triax solution and the absolute temperature was 18° to 20° C. The dye laser was charged with 14 KV on the high voltage triggering circuit resulting in a laser output intensity of 150 to 20 mJ/pulse. The optical density of the dye solution was measured 2 times during the laser operation by removing a 3 mL sample and obtaining a UV/vis spectrum. The sample was stored for later HPLC analysis. The previously described method was employed to determine acetaldehyde concentration in the 2 samples. The laser was operated at 0.5 Hz for 890 pulses, and the performance of the dye laser (compared with the stabilized laser experiments) was related to dye laser output as shown in FIG. 15, to optical density of the dye solution at the lasing wavelength of coumarin 425 as shown in FIG. 16, and to acetaldehyde concentration as shown in FIG. 17.

EXAMPLE 5

Borohydride Exchange Resin Stabilize LD 425 Dye Solution in a Flashlamp Pumped Dye Laser. The modified Phase-R filter housing was loaded with 18.4 g of borohydride exchange resin and connected in the dye line between the circulator pump and the flashlamp in the Phase-R dye laser circulation system as illustrated in FIG. 2. The cleaned dye system was charged with 1.5 L of air saturated $2.0 \times 10^{-4}$M LD 425 in absolute ethanol. The triax solution was 1.5 L of distilled water. The solutions were temperature equilibrated such that the dye solution was 0.2° C. colder than the triax solution and the absolute temperature was 18° to 20° C. The dye laser was charged with 14 KV on the high voltage triggering circuit resulting in a laser output intensity of 235 to 40 mJ/pulse. The optical density of the dye solution was measured 4 times during the laser operation by removing a 3 mL sample and obtaining a UV/vis spectrum. The sample was then stored for subsequent HPLC analysis. The laser was operated at 0.5 Hz for 1400 pulses, and the performance of the dye laser (compared with the unstabilized laser experiment) was related to dye laser output as shown in FIG. 15 and to optical density of the dye solution at the lasing wavelength of LD 425 as shown in FIG. 16.

Results

As is evident from the results indicated in FIG. 5, the stabilized excimer laser pumped Coumarin 460 dye laser of Example 1 in accordance with the present invention showed about 25% higher output efficiency and more stable output efficiency with the filter cartridge in the dye system as compared to the unstabilized laser of Comparative Example 1. The output is shown as % efficiency to correct for differences in the pump power as a function of time and experiment. FIG. 6 further shows that the stabilized dye laser of Example 1 exhibits improved optical density characteristics at the lasing wavelength over that of the unstabilized dye laser of Comparative Example 1.

As is evident from the results indicated in FIG. 7, the stabilized flashlamp pumped Coumarin 460 dye laser of Example 2 shows greater than 100% more initial output power and lasing at greater than 200 mJ/pulse even to 7000 pulses with the filter cartridge in the dye system as compared to the unstabilized dye laser of Comparative Example 2. The laser of Comparative Example 2 exhibited an initial power of only about 140 mJ/pulse and diminished to about 50 mJ/pulse in less than 500 pulses. FIG. 8 further evidences the advantageously low optical density characteristics exhibited by the dye laser of Example 2 in contrast to the poorer optical density exhibited by the dye laser of Comparative Example 2.

The results indicated in FIG. 10 show that the stabilized flashlamp pumped dye laser of Example 3, which additionally employs an acidic ion exchange resin to control the release of amine vapors, showed greater than about 70% more initial output power with the filter cartridge in the dye system as compared to the unstabilized dye laser of Comparative Example 2. However, it also appears that use of the acidic ion exchange resin in the dye system to inhibit the release of amine vapors may have somewhat lowered laser output power in view of the higher laser output power exhibited by the laser of Example 2 which did not include an acidic ion exchange resin to control amine vapors. FIG. 11 shows improved optical density characteristics exhibited by the stabilized laser of Example 3 in contrast to the poor optical density characteristics exhibited by the unstabilized laser of Comparative Example 2.

The results of FIG. 12 indicate that the stabilized flashlamp pumped Coumarin 480 dye laser of Example 4 showed greater than 30% more initial power and lasing at greater than 250 mJ/pulse even to 6000 pulses with the filter cartridge in the dye stream as compared to the unstabilized dye laser of Comparative Example 4 which exhibited a drop in power to less than 50 mJ/pulse in 500 pulses. FIG. 13 shows the advantageously lower optical density and FIG. 14 the advantageously lower acetaldehyde concentration exhibited by the stabilized dye laser of Example 4 in contrast to the poorer characteristics exhibited by the unstabilized dye laser of Comparative Example 4.

The results of FIG. 15 indicate that the stabilized flashlamp pumped LD 425 dye laser of Example 5 showed 50% more initial power and lasing at greater than 100 mJ/pulse for 1000 pulses with the filter cartridge in the dye stream as compared to the unstabilized dye laser of Comparative Example 5 which showed a power drop to less than 100 mJ/pulse in approximately 100 pulses. Consequently, the filter cartridge of the present invention improved the performance of flashlamp pumped dye laser by approximately an order to magnitude. The significance of these results is further realized by recognizing that the combination of flashlamp pumped LD 425, Coumarin 460 and Coumarin 480 dye lasers provides tunable light covering the entire region from 405 to 503 nm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A method for improving the performance of a dye laser having a dye circulation stream which comprises adding to the dye circulation stream thereof a resin bound anion stabilizing agent which is capable of releasing trialkylamine into the dye circulation stream and/or reducing carbonyl functional groups of material in the stream to alcohol functional groups.

2. The method of claim 1, wherein said resin bound anion stabilizing agent is contained in a filter cartridge for insertion into the dye circulation stream of the dye laser.

3. A method for improving the performance of a dye laser which comprises adding a borohydride reducing agent into the dye circulation stream of the dye laser.

4. The method of claim 1, wherein the trialkylamine bears $C_1$–$C_{10}$ alkyl groups.

5. The method of claim 1, wherein the trialkylamine bears $C_1$–$C_4$ alkyl groups.

6. The method of claim 1, wherein the trialkylamine is trimethylamine.

7. The method of claim 1, wherein the trialkylamine is tri-n-butylamine.

8. The method of claim 1, wherein the resin bound anion stabilizing agent contains an anion selected from the group consisting of borohydride, chloride, bromide and hydroxide.

9. The method of claim 1, wherein the resin in the resin bound anion stabilizing agent is a cross-linked polymer.

10. The method of claim 9, wherein the cross-linked polymer bears a quaternary ammonium group.

11. The method of claim 10, wherein the quaternary ammonium groups bears $C_1$–$C_{10}$ alkyl groups.

12. The method of claim 10, wherein the quaternary ammonium group bears $C_1$–$C_4$ alkyl groups.

13. The method of claim 1, wherein the resin of the resin bound anion stabilizing agent is in the form of beads having a size of from 20 to 200 mesh.

14. The method of claim 1, wherein the resin bound anion stabilizing agent is a resin bound borohydride stabilizing agent.

15. The method of claim 14, wherein the stabilizing agent contains as a resin a divinylbenzene cross-linked poly(aminomethylstyrene) resin with the amino groups permethylated to make trimethylammonium groups.

16. The method of claim 1, wherein the resin bound anion stabilizing agent has a monomeric unit of the following formula:

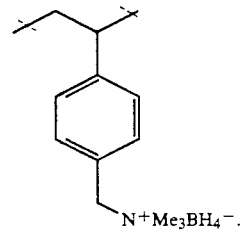

17. The method of claim 1, wherein the resin bound anion stabilizing agent has a monomeric unit of the following formula:

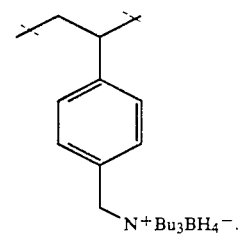

18. The method of claim 1, wherein the resin bound anion stabilizing agent has a monomeric unit of the following formula:

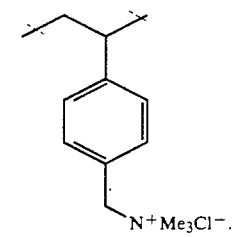

* * * * *